(No Model.) 2 Sheets—Sheet 2.
G. R. HOLDEN.
MACHINE FOR REMOVING PLUMAGE FROM FEATHERS.
No. 328,404. Patented Oct. 13, 1885.
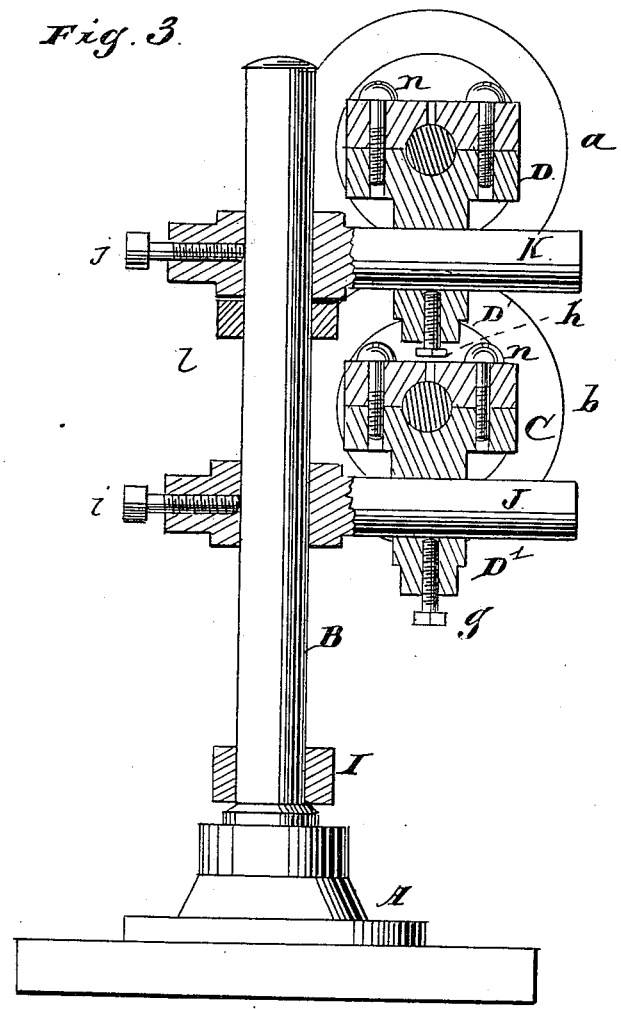

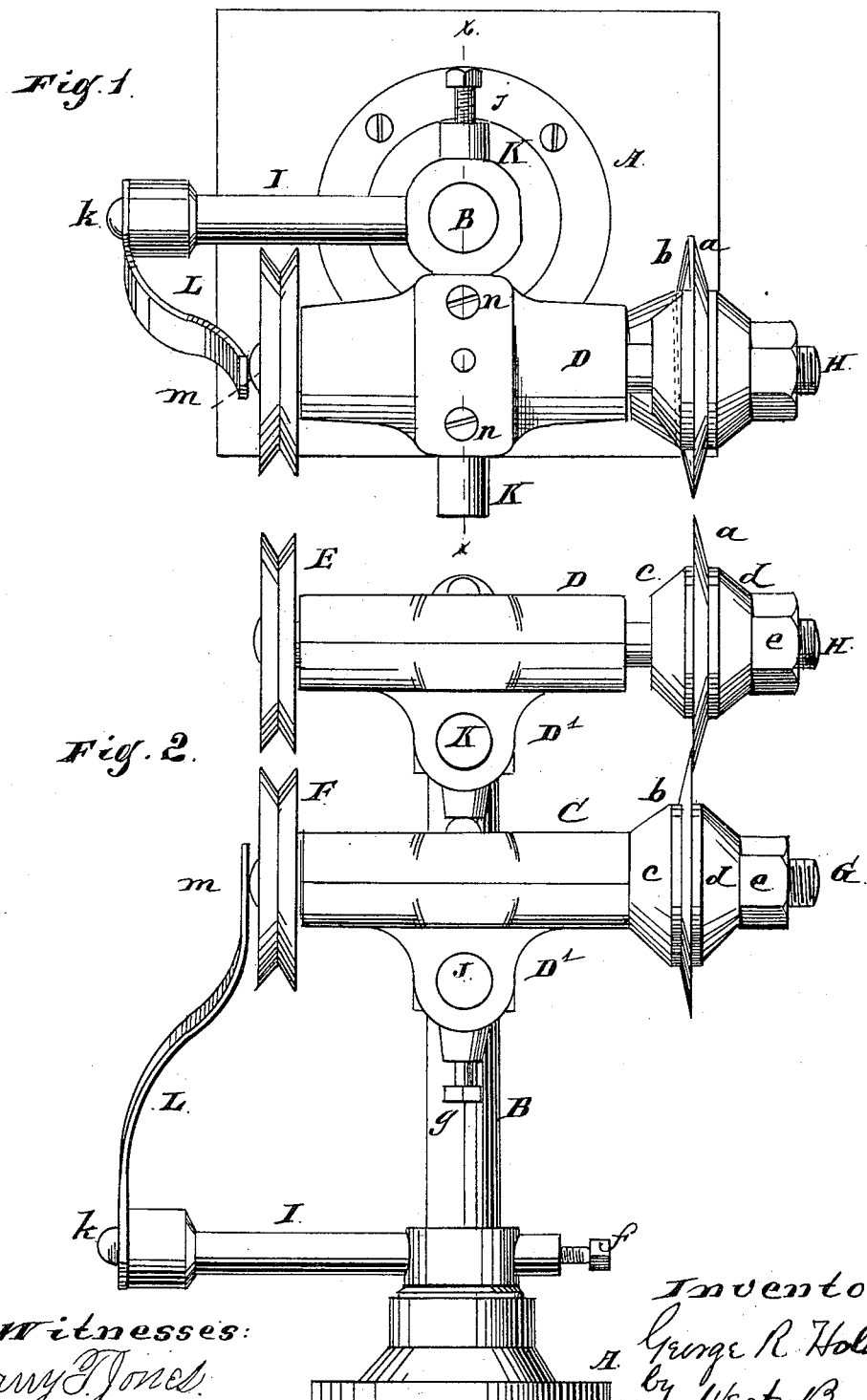

UNITED STATES PATENT OFFICE.

GEORGE R. HOLDEN, OF MICHIGAN CITY, INDIANA, ASSIGNOR TO THE WARREN FEATHERBONE COMPANY, OF CHICAGO, ILLINOIS.

MACHINE FOR REMOVING PLUMAGE FROM FEATHERS.

SPECIFICATION forming part of Letters Patent No. 328,404, dated October 13, 1885.

Application filed March 7, 1885. Serial No. 158,106. (No model.)

*To all whom it may concern:*

Be it known that I, GEORGE R. HOLDEN, residing at Michigan City, in the county of La Porte and State of Indiana, and a citizen of the United States, have invented certain new and useful Improvements in Machines for Removing Plumage from Feathers, of which the following is a full description, reference being had to the accompanying drawings, in which—

Figure 1 is a top or plan view; Fig. 2, a side elevation; Fig. 3, a cross-section on line $xx$ of Fig. 1.

The object of this invention is to provide a machine for removing the plumage or vanes from quills and feathers; and its nature consists in the several improved parts and combinations of parts, hereinafter described and claimed as new.

In the drawings, A indicates the base; B, the upright or post; C, the box or bearing for the lower shaft; D, a similar bearing-box for the upper shaft; D', brackets on the under sections of the boxes; E F, driving-pulleys; G H, shafts; I, rod or bar for supporting the spring L; J K, adjustable brackets for supporting the boxes C D; L, spring; $a\,b$, cutting-disks; $c\,d$, collars for attaching the cutting-disks; $e$, nuts for locking the collars; $f, g, h, i$, and $j$, set-screws; $k$, screw for attaching the spring; $l$, collar provided with a set-screw for furnishing an additional support to the shaft K; $m$, rounded end of the shaft $g$; $n$, screws or bolts for connecting the bearing-sections together.

The base A is made in any suitable form, and is provided with a cylindrical post or shaft, B. These parts may be cast together and the shaft B afterward turned; or the shaft may be made of wrought-iron and be screwed or otherwise secured to the base. Upon this shaft or standard is mounted an adjustable arm, I, at the end of which the spring L is securely attached. This arm is provided with a collar which surrounds the shaft, and a set-screw, $f$, so that it may be adjusted upon the standard B, or turned around inside of the shaft, as may be desired. The shafts J and K are also mounted upon this standard, and are provided with similar collars and with set-screws $i$ and $j$. The projecting ends of these shafts or arms are rounded and pass through the brackets D' of the bearing-box. These brackets D' are also provided with set-screws $g$ and $h$, by which the bearing-boxes are firmly secured to their respective shafts or brackets.

The bearing-boxes $c\,d$, as shown, are made in sections or halves and fastened together by the screws $n$. They may, however, be made solid and babbitted, if desired, as the shafts $g\,h$ may be passed through them. The bearing-box C is nearly full length between the driving-wheel F and the collar $c$, while the upper bearing, D, is somewhat shorter. The end $m$ of the shaft G which comes in contact with the spring L is rounded, as shown. Additional supports $l$ may be provided to give greater security for the brackets J K, if desired. Only one is shown for K; another may be added for J, or both may be omitted.

The cutters $a\,b$ are beveled in opposite directions, as shown, and their cutting-edges overlap each other, so as to produce a sharp shear-cut, and by turning the brackets J or K slightly upon the central post they may be made to impinge against each other at a greater or less angle, and by the use of the set-screws $i\,j$ they may be made to overlap each other a greater or less distance, as may be desired, or readjusted as they may be worn away in use and in sharpening; and in order that the turning of the shaft upon its supporting-post may not remove it from the spring the spring-support J is also made adjustable, both vertically and around the shaft, so that the spring L may at all times maintain its proper pressure against the end $m$. This spring keeps the cutters $a\,b$ in contact with each other at all times by pressing the cutter $b$ against the cutter $a$.

In operation the cutters $a\,b$ are made to revolve in opposite directions, and for this reason two driving-wheels are shown, so that they may be run by belts, and by making one an open and the other a crossed belt they may both be driven from the same driving-pulley, or they may be geared together so as to move in unison; but I prefer to drive them separately, as by this separate arrangement, when desired, I can drive one somewhat faster than the other, so as to give an improved shear-cut to the operation. The feathers or quills are fed in at the point of contact between the cutters a b, the quill being pressed against the cutters a. A support may be provided for the quill at this point, if desired; but the machine will operate satisfactorily without it, and as will be understood from the description, by the arrangement of mounting these cutters and their supports upon a single post the shafts G H may be varied in their relation to each other, so as to permit of the knives approaching each other in the same plane or at different planes, so as to give a sharper and stronger cut.

What I claim as new, and desire to secure by Letters Patent, is—

1. The overlapping and bevel disk-cutters a b, arranged to revolve in opposite directions, substantially as described.

2. The combination of the spring L with the shaft J, for holding the cutting-edges of the disks a b, substantially as specified.

3. The combination of the brackets D' with the cylindrical arms J K, and set-screws g h, for adjusting the overlapping of the cutters a b, substantially as specified.

4. The combination of the adjustable supporting-arms J K and set-screws i j, with the shaft B and boxes C D supported thereon, for adjusting the cutters a b in the plane of contact, substantially as set forth.

5. The combination and arrangement of the bearing-boxes C D, having the brackets D', with the adjustable supporting-arms J K, adjustable arm I, and their respective set-screws, spring L, and post B, whereby the several adjustments may be obtained, substantially as described.

GEORGE R. HOLDEN.

Witnesses:
WASHINGTON P. HARMAN,
EDWARD K. WARREN.